Patented June 25, 1935

2,006,310

UNITED STATES PATENT OFFICE 2,006,310

RUBBER COMPOUNDING

Arthur B. Cowdery, Needham, Mass., assignor to The Barrett Company, New York, N. Y., a corporation of New Jersey No Drawing. Application August 20, 1932
Serial No. 629,749

11 Claims. (Cl. 106—23)

This invention relates to rubber compounding, and more particularly to a process for compounding rubber involving the use of softening and/or dispersing agents. The invention also relates to the rubber compound resulting from the practice of this invention and also to the softening and/or dispersing agents employed in accordance with the invention.

Heretofore, coal tar distillate oils, palm oil, pine tar, various pitches and tars and other like materials have been added to the rubber mix for the purpose of dispersing fillers such as carbon black, zinc oxide, clays, etc. commonly used in rubber compounding. Resinous materials, such as the polymerization products of cumarone and indene, derived from coal tar oils have also been employed in rubber compounds.

In general, coal tar distillate oils previously used comprise relatively high boiling oils which, after cooling, contain substantial amounts of crystalline material consisting principally of naphthalene, anthracene, phrenanthrene and other hydrocarbons of high molecular weight. The use of such oils has been satisfactory in many instances relative to softening and dispersing properties, but has been found to cause discoloration or blooming of the finished rubber product. Other coal tar distillate oils used in compounding rubber are objectionable in certain respects since a too rapid cure is obtained. Some more or less similar coal tar distillate oils have a tendency to dry out the rubber compound before curing.

It is the principal object of the invention to provide rubber compounding agents free from objections mentioned. It is the aim of the invention to improve dispersion of fillers used in rubber compounding while at the same time avoiding discoloration of the rubber products. Adequate dispersion improves the physical properties of the rubber compound and increases the resistance of the compound to abrasion and wear. It is an additional object of the invention to provide rubber compounding agents which do not cause the rubber compounds to dry out before curing. The invention also provides compounding agents characterized by the fact that such improved compounding agents have little or no tendency to activate the rate of cure. Furthermore, the invention provides a process for compounding rubber which yields rubber products having increased tensile strength; resistance to tear, abrasion and cracking; and also having improved aging properties. Additional objects and advantages of the invention will appear from a consideration of the following detailed description:

I have found that by blending the resinous heat polymerized constituents of coal tar oils, such as crude benzol, toluol, xylol, solvent naphtha, light oil, and the like, and similar oils such as drip oil from gas manufacture, with coal tar distillate oils or light coal tar, an oil-resin product is obtained which may be used to marked advantage in rubber compounding as a softening and/or dispersing agent. According to one embodiment of the invention, the improved agents comprise the products obtained by blending cumarone resin, resulting from the polymerization of polymerizable constituents of solvent naphtha by heat treatment of the latter, together with coal tar distillate oils having a specific gravity above substantially 1.06 at 38° C., boiling above substantially 200° C., and containing substantially no crystalline material.

Cumarone resin is a product which may be obtained by polymerization of cumarone, indene, styrene and the like contained in solvent naphtha or similar oils. Such resin may be obtained in different grades of hardness, ranging from liquid and plastic substances to hard brittle material having a high melting point. The cumarone resin employed in accordance with the invention is that obtained by heat treatment of coal tar distillate oils and similar oils, for example distillation of solvent naphtha to obtain purified naphtha, in which operation a residue is left behind in the still which consists of resinous compounds of the naphtha such as indene and styrene that have been polymerized as a result of the heating of the oil in the distillation thereof. A suitable cumarone resin may also be obtained as a result of the distillation or heat treatment of drip oil from gas manufacture which contains a substantial proportion of resinous constituents of the cumarone-indene series which are polymerized to a greater or less extent during the distillation and remain behind in the still as a resinous mass. The invention comprehends the use of heat polymerized cumarone resins varying in melting point from below normal room temperature to about 140° C. or higher. These resins will ordinarily consist predominantly of polymerized indene and styrene with but little cumarone, but are commonly referred to as cumarone or para-cumarone resins and will be so referred to in this specification and claims. The resinous substances employed need not necessarily be high grade cumarone resins such as those obtained, for example, by methods involving vacuum distillation, but may be the crude residues remaining in the still after distillation of the oil at atmospheric pressure.

A suitable coal tar oil for use in accordance with my invention is, for example, an oil or light tar boiling above about 170° C., preferably above 200° C., and preferably containing substantially no crystalline material. In accordance with the preferred embodiments of the invention, a coal tar oil fraction is selected which, after removal of crystalline material therefrom, will have a specific gravity above substantially 1.06 at 38° C. and will boil above substantially 200° C., the oil being permitted to cool to about 25° C. and stand until the crystalline material which forms therein has settled. The resultant clear oil is then removed, for example, by decantation. The limpid oil so produced may be blended with heat polymerized cumarone resin, as hereinafter noted, and the blend compounded with rubber in accordance with the usual procedure. One such oil which may be employed, to particular advantage, is the medium distillate obtained from the distillation of coal tar and having a specific gravity of about 1.07 at 38° C., and which when distilled to the temperatures below indicated in the column at the left gives off the percentages by weight of distillate indicated by the figures opposite the temperature figures:

| | Per cent |
|---|---|
| 210° C | 0.7 |
| 235° C | 6.9 |
| 300° C | 51.6 |

Another example of a coal tar oil found to be particularly suitable as a constituent of the blend utilized as a softening and/or dispersing agent in the compounding of rubber is the heavier distillate, obtained from coal tar, having a specific gravity of about 1.15 at 38° C., and which when distilled to the temperatures below indicated in the column at the left gives off the percentages by weight of distillate indicated by the figures transversely opposite the corresponding temperature figures:

| | Per cent |
|---|---|
| 210° C | ---- |
| 235° C | ---- |
| 300° C | 5.1 |
| 315° C | 7.4 |
| 355° C | 20.2 |

Such oils, as noted, may be obtained as distillate fractions from the usual distillation of coal tar such as coke oven tar and the like, and may consist of a single fraction or a mixture of two or more fractions. The oils are permitted to settle, and the resultant clear oil, free or substantially free from crystals or suspended materials at 25° C., i. e., limpid oils, are utilized in forming the oil-resin blend.

Another oil suitable for the purposes of the invention is a preferably dehydrated crude creosote oil, or one of the oily fractions thereof.

It is to be noted that when making up the oil-resin blends in accordance with the invention it is preferred to employ coal tar oils substantially free from crystals or suspended matter, and having a specific gravity of above 1.06 at 38° C., preferably oils having a specific gravity from 1.06 to 1.15 at 38° C., and boiling above substantially 200° C.

The blends comprising the resinous heat polymerized constituents of coal tar oils and coal tar distillate oils may vary considerably in composition depending more or less on the nature of the rubber compounding formula employed. I have found that blends varying in composition from about one part cumarone resin and about five parts of coal tar oils, on the one hand, to about five parts cumarone resin and about one part of coal tar oils, on the other hand, may be used to advantage. The following is an example of rubber compounded in accordance with the invention:

| | Parts by weight |
|---|---|
| Smoked sheet | 65.65 |
| Gray reclaim | 20.00 |
| Zinc oxide | 5.0 |
| Oil resin blend (1:1) | 5.0 |
| Stearic acid | 1.0 |
| agerite powder (antioxidant) | 1.0 |
| Sulphur | 2.0 |
| Saptax (accelerator) | 0.35 |

The amount of oil-resin compound, relative to the rubber, may vary from less than 2% by weight up and may ordinarily be from 5-10% of the rubber.

In the example, the oil-resin composition is made up of equal parts by weight of the above mentioned coal tar distillate oil having a specific gravity of 1.07 at 38° C., and a heat polymerized cumarone resin having a melting point of about 105°-115° C.

The blend of cumarone resin and coal tar oils may be made in various ways. The molten resin, running from the final step of the manufacturing process, may be mixed with the desired amount of coal tar oil. If the resin is already a finished product and is solid at room temperature, the resin may be melted and mixed with the coal tar oil. Again, the required amount of coal tar oil may be added to the crude solvent naphtha prior to polymerization, and polymerization then effected in the presence of the coal tar oil, final distillation being so controlled that the desired amount of coal tar oil is left in the resin produced.

When employing the improved dispersing and/or softening agents, compounding of the rubber products may be effected by any of the usual or known methods customary in practice as by simultaneous mixing of rubber, filler and softener.

The use of the oil-resin composition in the manner set forth offers substantial practical advantages. Dispersion of filling material through the rubber stock is expedited. As noted, some coal tar oils, while serving well as softening and/or dispersing agents, tend to shorten the time of cure below standard. The oil-resin blends of the invention do not have this objectionable effect and still retain the advantages of coal tar oils relative to softening and/or dispersing. Since the coal tar oils preferably employed are crystalline free, blooming or discoloration of the products is avoided. The oil-resin compounds handle easily, pouring at ordinary temperatures. Rubber stocks containing the oil-resin compounds do not dry out, but retain the desired tackiness, this being an important feature in manufacturing where a product is built up of many plies which must be bonded together firmly. Furthermore, the improved rubber stocks made up in accordance with the invention show substantially no tendency to set up at roll mill temperatures, a difficulty which is likely to be encountered in operating with stock including some known softening and/or dispersing agents. Standard tests relative to tensile strength, modulus, and per cent of elongation indicate that optimum cure is obtained in the normal time of cure to be expected from the curatives used and the prevailing operating conditions. Hardness of the rubber products is also within the approved ranges.

This invention, accordingly, renders it possible to produce rubber compositions which result in rubber articles possessing greater wearing qualities than articles heretofore obtained, and is applicable to the manufacture of tire treads and tubes, rubber heels and soles, and various mechanical rubber goods where the improved qualities imparted are desirable.

The term "coal tar oil" as used in the appended claims is intended to include coal tar and coal tar distillate oil.

I claim:

1. A compound comprising rubber having incorporated therewith an oil-resin compound comprising about 1 to about 5 parts by weight of heat polymerized cumarone resin, and about 5 to about 1 part by weight of a coal tar oil substantially free from crystalline material at 25° C. and boiling at not less than about 170° C.

2. A composition comprising rubber having incorporated therein an oil-resin compound comprising about 1 to about 5 parts by weight of heat polymerized cumarone resin, and about 5 to about 1 part by weight of a coal tar oil substantially free from crystalline material at 25° C., and boiling above substantially 200° C.

3. A composition comprising rubber having therein an oil-resin compound comprising from about 5 to about 1 part by weight of a coal tar oil substantially free from crystalline matter at 25° C. and having a specific gravity of not less than substantially 1.06 at 38° C. and boiling above substantially 200° C., and from about 1 part to about 5 parts by weight of heat polymerized cumarone resin melting at temperatures ranging from less than normal to about 140° C.

4. A step in the process of compounding rubber which comprises incorporating in the rubber mix an oil-resin compound comprising from about 5 to about 1 part by weight of a coal tar oil substantially free from crystalline matter at 25° C. and having a specific gravity of not less than substantially 1.06 at 38° C. and boiling above substantially 200° C., and from about 1 part to about 5 parts by weight of heat polymerized cumarone resin melting at temperatures ranging from less than normal to about 140° C.

5. A non-fluid rubber composition comprising rubber having incorporated therewith an oil-resin compound comprising heat polymerized cumarone resin and coal tar oil substantially free from crystalline material at 25° C. and boiling at not less than about 170° C., the amount of resin present, relative to the rubber, being comparatively small, and the amount of oil present, relative to the rubber, being comparatively small and insufficient to render the rubber composition fluid.

6. A non-fluid rubber composition comprising rubber having incorporated therewith an oil-resin compound comprising heat polymerized cumarone resin and coal tar oil substantially free from crystalline material at 25° C., and having a specific gravity of not less than substantially 1.06 at 38° C., the amount of resin present, relative to the rubber, being comparatively small, and the amount of oil present, relative to the rubber, being comparatively small and insufficient to render the rubber composition fluid.

7. The step in the process of compounding rubber which comprises incorporating with the rubber vulcanizing material, cumarone resin and coal tar oil, the amount of resin present, relative to the rubber, being comparatively small, and the amount of oil present, relative to the rubber, being comparatively small and insufficient to render the resulting rubber composition fluid.

8. The step in the process of compounding rubber which comprises incorporating with the rubber vulcanizing material, cumarone resin and coal tar oil, the amount of resin present, relative to the rubber, being comparatively small, and the amount of oil present, relative to the rubber, being comparatively small and insufficient to render the resulting rubber composition fluid, and the ratio of resin to oil being such as to not substantially shorten the time of cure when the said resulting composition is vulcanized.

9. The step in the process of compounding rubber which comprises incorporating with the rubber an oil-resin compound comprising cumarone resin and coal tar oil substantially free from crystalline material at 25° C., and boiling at not less than about 170° C., the amount of resin present, relative to the rubber, being comparatively small, and the amount of oil present, relative to the rubber, being comparatively small and insufficient to render the resulting rubber composition fluid.

10. The step in the process of compounding rubber which comprises incorporating with the rubber an oil-resin compound comprising cumarone resin and coal tar oil substantially free from crystalline material at 25° C., and having a specific gravity of not less than substantially 1.06 at 38° C. and boiling above substantially 200° C., the amount of resin present, relative to the rubber, being comparatively small, and the amount of oil present, relative to the rubber, being comparatively small and insufficient to render the resulting rubber composition fluid.

11. A solid, vulcanized rubber product containing reacted vulcanizing material, cumarone resin and coal tar oil, the amount of resin present, relative to the rubber, being comparatively small and the amount of oil present, relative to the rubber, being comparatively small.

ARTHUR B. COWDERY.